US012488811B2

(12) United States Patent
Leck et al.

(10) Patent No.: US 12,488,811 B2
(45) Date of Patent: Dec. 2, 2025

(54) QUICK SAVE METHOD FOR RECORDING SURGICAL VIDEOS

(71) Applicant: Leica Instruments (Singapore) Pte. Ltd., Singapore (SG)

(72) Inventors: Kheng Swee Leck, Singapore (SG); Jie Huang, Singapore (SG)

(73) Assignee: Leica Instruments (Singapore) Pte. Ltd., Singapore (SG)

( * ) Notice: Subject to any disclaimer, the term of this patent is extended or adjusted under 35 U.S.C. 154(b) by 2 days.

(21) Appl. No.: 18/685,525

(22) PCT Filed: Aug. 18, 2022

(86) PCT No.: PCT/EP2022/073074
§ 371 (c)(1),
(2) Date: Feb. 22, 2024

(87) PCT Pub. No.: WO2023/025652
PCT Pub. Date: Mar. 2, 2023

(65) Prior Publication Data
US 2024/0355361 A1    Oct. 24, 2024

(30) Foreign Application Priority Data
Aug. 24, 2021 (DE) .......................... 102021121932.9

(51) Int. Cl.
| G11B 27/36 | (2006.01) |
| G06Q 10/101 | (2023.01) |
| G16H 10/60 | (2018.01) |
| G16H 10/65 | (2018.01) |
| G16H 30/20 | (2018.01) |
| H04L 67/06 | (2022.01) |
| H04N 5/76 | (2006.01) |
| H04N 21/41 | (2011.01) |
| H04N 21/414 | (2011.01) |
| H04N 21/433 | (2011.01) |
| H04N 21/436 | (2011.01) |

(Continued)

(52) U.S. Cl.
CPC ............... *G11B 27/36* (2013.01); *H04N 5/76* (2013.01)

(58) Field of Classification Search
None
See application file for complete search history.

(56) References Cited

U.S. PATENT DOCUMENTS

2007/0162271 A1    7/2007 Brunet et al.
2008/0242946 A1    10/2008 Krachman
(Continued)

OTHER PUBLICATIONS

Aswath Sivakumaran: "The Evolution of The Windows Copy Dialog", Apr. 23, 2020, <URL: https://blog.prototypr.io/windows-copy-function-followed-form-11cf4bf6a87e?gi=77885ad76973>, pp. 1-7.

(Continued)

*Primary Examiner* — Hung Q Dang
(74) *Attorney, Agent, or Firm* — SPL Patent Attorneys PartG mbB; Yong Beom Hwang

(57) ABSTRACT

An apparatus (200) is disclosed which is configured to copy (342b) a video (211, 212, 213) of a surgical procedure from a first device (201) to a second device (202); determine (342c) when the video (211, 212, 213) is copied to the second device (202); and cause a displayed indication (410) that the copying is complete, automatically, after the determination.

11 Claims, 3 Drawing Sheets

Figure 1:
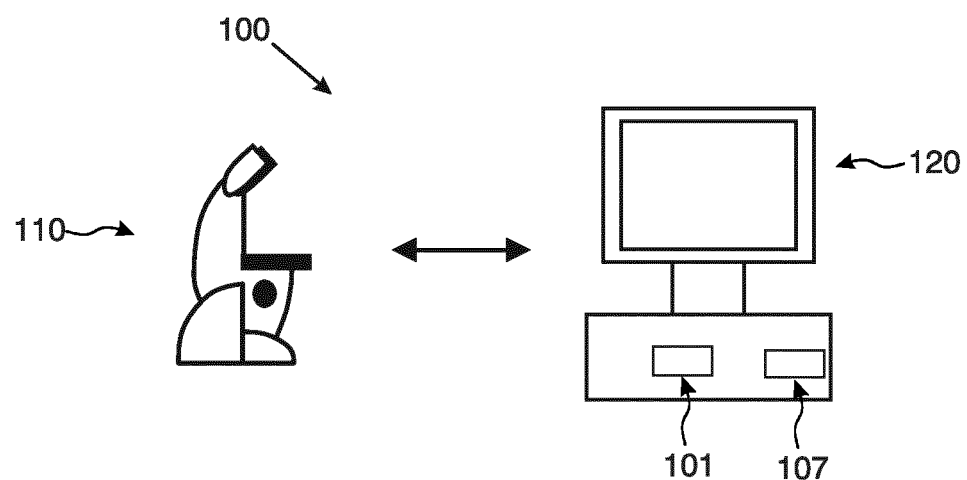

(51) Int. Cl.
*H04N 21/45* (2011.01)
*H04N 21/485* (2011.01)

(56) References Cited

U.S. PATENT DOCUMENTS

| | | | |
|---|---|---|---|
| 2010/0154067 | A1 | 6/2010 | Shimizu et al. |
| 2017/0046485 | A1 | 2/2017 | Reicher et al. |
| 2017/0180424 | A1* | 6/2017 | Hardee .................. H04L 67/06 |
| 2018/0101678 | A1* | 4/2018 | Rosa .................... G06F 3/0622 |
| 2021/0165915 | A1* | 6/2021 | Goodwin ................ G06F 21/64 |
| 2021/0265031 | A1* | 8/2021 | Slezic ................... G16H 10/60 |

OTHER PUBLICATIONS

Anonymous: "Chapter 8 Reviewing Videos and Creating Reports", PillCamTMN CApsule Endoscopy User Manual PillCam TM Desktop Software Version 9.0, Nov. 21, 2016, pp. 1-232, XP055866544, Retrieved from the Internet: URL: https://www.pillcamcrohnscapsule.eu/as sets(pdf/DOC2928-02-PillCam-Desktop-SWv9U MEN.pdf; "Saving a Study to Another Archive"; pp. 125-126.

* cited by examiner

QUICK SAVE METHOD FOR RECORDING SURGICAL VIDEOS

TECHNICAL FIELD

Examples relate to a method and apparatus for saving recorded surgical procedures.

BACKGROUND

Medical surgeries are often recorded. For example, surgeries may be filmed as a legal requirement in many countries, and as teaching resources for medical students across the world. Video records of surgeries can be handled by apparatuses that include computer systems.

SUMMARY

Herein is described an apparatus, configured to copy a video of a surgical procedure from a first device to a second device. The apparatus can determine when the video is copied to the second device, and cause a displayed indication that the copying is complete, automatically, after the determination. The apparatus can reduce the risk of copying errors, particularly for comparatively large surgical video records, and reduce the burden on operators to manage video records.

The apparatus can select the video for copying based on at least one of: a user ID; the second device; an identifier which is read from the second device; or an associated ID which is associated with the video. The apparatus can reduce the risk of copying errors, particularly for comparatively large surgical video records, and reduce the burden on operators to manage video records.

The apparatus can compare the associated ID with at least one of: the user ID, the second device, or the identifier; and select the video for copying based on comparing the associated ID of the video with at least one of: a user ID; the second device; or an identifier which is read from the second device. The apparatus can reduce the risk of copying errors, particularly for comparatively large surgical video records, and reduce the burden on operators to manage video records.

The apparatus can automatically begin selecting the video when the second device is identified. The apparatus can reduce the risk of copying errors, particularly for comparatively large surgical video records, and reduce the burden on operators to manage video records.

The apparatus can start copying after exactly one user input after the video is selected, the one user input being a mouse click, a key press, an audible command, or a tap of a touch-sensitive device. The apparatus can reduce the risk of copying errors, particularly for comparatively large surgical video records, and reduce the burden on operators to manage video records.

The apparatus can start copying automatically after the video is selected. The apparatus can reduce the risk of copying errors, particularly for comparatively large surgical video records, and reduce the burden on operators to manage video records.

The apparatus can select the video from a plurality of videos stored on the first device. The apparatus can reduce the risk of copying errors, particularly for comparatively large surgical video records, and reduce the burden on operators to manage video records.

The apparatus can mark the video in the first device for deletion after the video is copied to the second device. The apparatus can reduce the risk of copying errors, particularly for comparatively large surgical video records, and reduce the burden on operators to manage video records.

The apparatus can include a processor and a memory. The apparatus can reduce the risk of copying errors, particularly for comparatively large surgical video records, and reduce the burden on operators to manage video records.

The apparatus can automatically disconnect the second device after the determination. The apparatus can reduce the risk of copying errors, particularly for comparatively large surgical video records, and reduce the burden on operators to manage video records.

A computer which includes the apparatus can be coupled to a surgical instrument. The computer can reduce the risk of copying errors, particularly for comparatively large surgical video records, and reduce the burden on operators to manage video records.

A method of copying a video of a surgical procedure is described herein. The method includes transferring data of a video of a surgical procedure from a first device to a second device; determining when the video is completely copied to the second device; and indicating that the copying is complete, automatically, after the determination. A computer program with a program code for performing the method is described herein. The computer program can be run on a processor. The method can reduce the risk of copying errors, particularly for comparatively large surgical video records, and reduce the burden on operators to manage video records.

SHORT DESCRIPTION OF THE FIGURES

Figure 2:
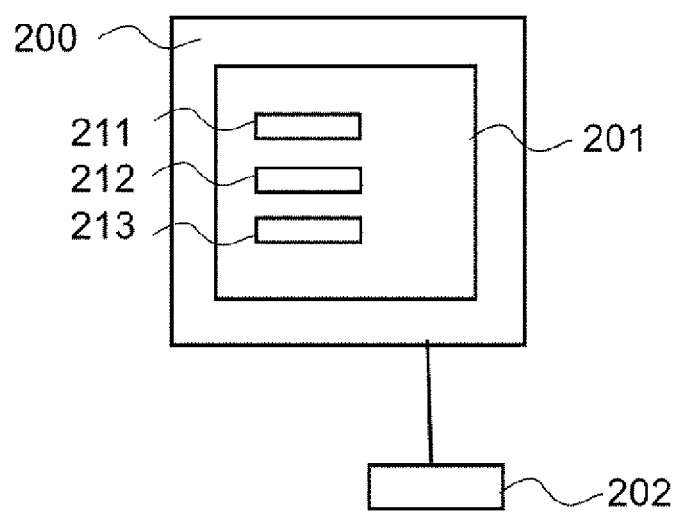
Figure 3:
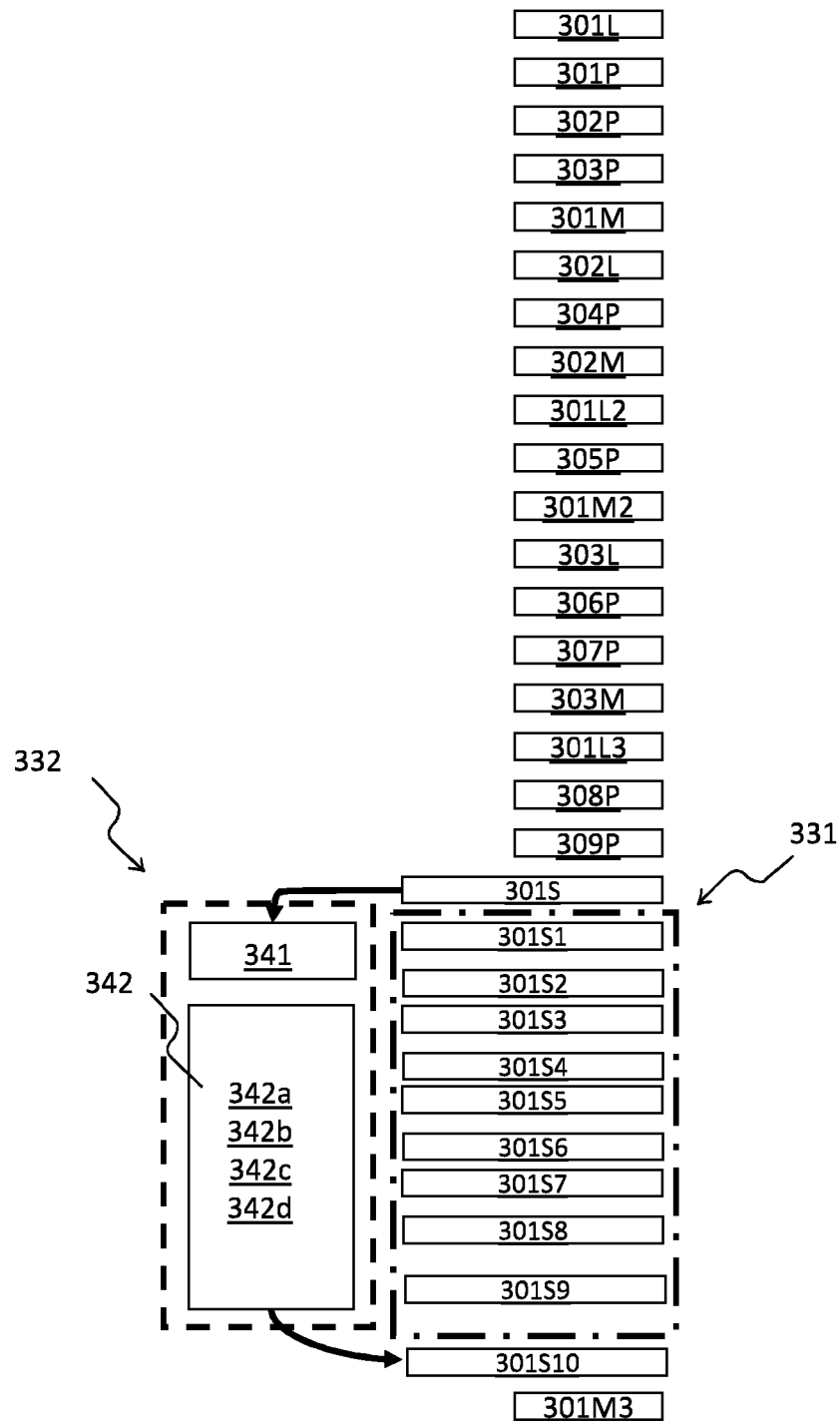
Figure 4:
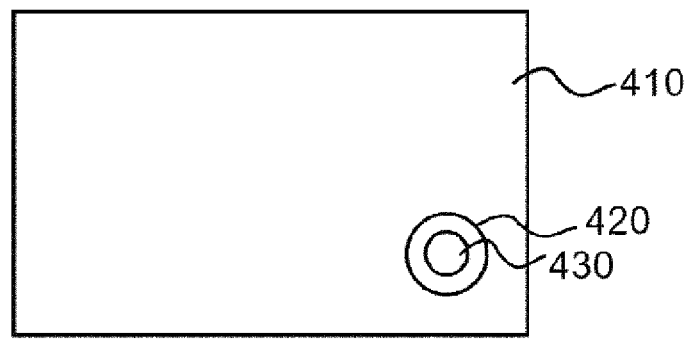
Figure 5:
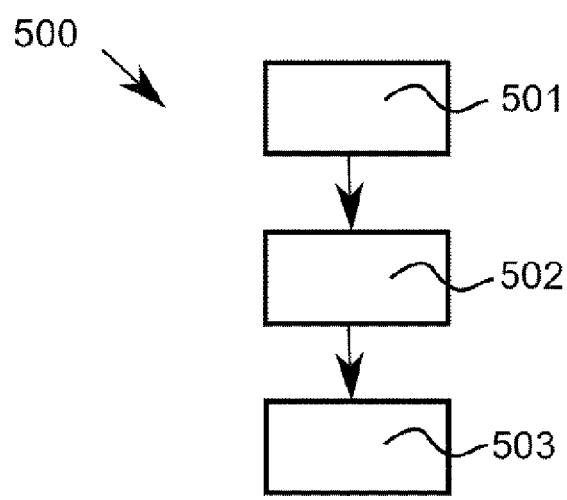

Some examples of apparatuses and/or methods will be described in the following by way of example only, and with reference to the accompanying figures, in which FIG. 1 illustrates a system;
FIG. 2 illustrates an apparatus;
FIG. 3 illustrates an example workflow;
FIG. 4 illustrates a notice; and
FIG. 5 illustrates a method.

DETAILED DESCRIPTION

Various examples will now be described more fully with reference to the accompanying drawings in which some examples are illustrated. In the figures, the thicknesses of lines, layers and/or regions may be exaggerated for clarity.

As used herein the term "and/or" includes any and all combinations of one or more of the associated listed items and may be abbreviated as "/". A trailing(s) indicates an optional plurality; e.g. "one or more."

Although some aspects can be described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Video recording of medical surgery procedures can be desirable and, in some regions of the world, may be mandatory. Video records may be part of an individual's medical record that identify the patient, support the diagnosis, justify the treatment, document the course and results, and/or promote continuity of care among healthcare providers. Alternatively/additionally records may serve as training materials, for students and/or clinical research resources. High resolution video recordings, possibly with augmented information, such as target area information, are possible. Video recordings can be augmented with better and more detailed annotation.

Recorded surgical videos, which may include augmented data/information, can be large in size, e.g. over 1 GB in storage. Conventionally, external storage, e.g. through USB, has been used to directly capture and/or save surgical videos. This approach can suffer from unstable transfer rates, especially for long surgeries. In some cases, video recordings are corrupted, e.g. due to errors and/or missing data in data transfer.

Herein are disclosed methods and apparatuses which may use an internal storage device. Methods and apparatuses herein may allow for stable transfer, particularly for recording/transferring surgical videos. A quick save method/apparatus is described herein, which can transfer recorded video into a lower speed external storage, e.g. in such a way to reduce errors such as operator and/or data transfer errors, and or such that the burden on the user for monitoring the data transfer is reduced. In some examples, the method/apparatus uses a single user action for a quick save method, such as a single click.

The methods and apparatuses described herein may free surgeons and other medical personal from tedious workflow process, such as by reducing the time to select videos for copy/transfer to a second device. There can alternatively/additionally be a reduced risk of corrupted surgical videos.

Some embodiments relate to a microscope comprising a system as described in connection with one or more of the FIGS. 1 to 4. Alternatively, a microscope may be part of or connected to a system as described in connection with one or more of the FIGS. 1 to 4.

FIG. 1 shows a schematic illustration of a system 100 configured to perform a method described herein. The system 100 comprises a microscope 110 and a computer system 120. The microscope 110 is configured to take images and is connected to the computer system 120. The computer system 120 is configured to execute at least a part of a method described herein. The computer system 120 may be configured to execute a machine learning algorithm. The computer system 120 and microscope 110 may be separate entities but can also be integrated together in one common housing. The computer system 120 may be part of a central processing system of the microscope 110 and/or the computer system 120 may be part of a subcomponent of the microscope 110, such as a sensor, an actor, a camera or an illumination unit, etc. of the microscope 110.

The computer system can include a processor 101. The computer system can include a memory 107. The processor 101 and/or memory 107 can be configured to operate the microscope and/or to perform the methods described herein, such as copying a video of a surgical procedure, particularly from a first device to a second device.

The computer system 120 may be a local computer device (e.g. personal computer, laptop, tablet computer or mobile phone) with one or more processors and one or more storage devices or may be a distributed computer system (e.g. a cloud computing system with one or more processors and one or more storage devices distributed at various locations, for example, at a local client and/or one or more remote server farms and/or data centers). The computer system 120 may comprise any circuit or combination of circuits. In one embodiment, the computer system 120 may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g. camera) or any other type of processor or processing circuit. Other types of circuits that may be included in the computer system 120 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The computer system 120 may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system 120 may also include a display device, one or more speakers, and a keyboard and/or controller, which can include a mouse, trackball, touch screen, voice-recognition device, or any other device that permits a system user to input information into and receive information from the computer system 120.

Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are possibly performed by any hardware apparatus.

The system 100, microscope 110, and/or computer system 120 can be configured to copy at least one video of a surgical procedure(s) from a first device 107 to a second device; determine when the video(s) is copied to the second device; and cause a displayed indication that the copying is complete, automatically, after the determination, e.g. without user input after the determination.

FIG. 2 illustrates an apparatus 200 coupled to a second device 202. The apparatus 200 can be part of the system 100 such as the computer system 120. As illustrated in FIG. 2, the first device 201 of the apparatus 200 can be the memory 207 and the second device 202 can be a memory device that is configured for reversible communicative coupling to the apparatus 200. For example, the coupling can be via universal serial bus USB. A transportable USB couplable storage device such as a flash drive is particularly contemplated as the second device 202.

FIG. 2 shows at least one video stored in the first device 201, such as first, second, and third videos 211, 212, 213.

The apparatus 200 can be configured to copy at least one video 211, 212, 213 of a surgical procedure(s) from the first device 201 to the second device 202; determine when the at least one video 211, 212, 213 is copied to the second device 202; and cause a displayed indication that the copying is complete, automatically, after the determination, such as on a monitor of the computer system 120. The apparatus 200 can alternatively/additionally cause a sound after the determination.

FIG. 3 illustrates an example workflow 300. The workflow includes different users such as surgeons logging in, acquiring video(s) from patient(s), and subsequently logging off. A user can optionally transfer a video(s), e.g. while logged on. Videos may be selected for copying to the secondary device 202. User selection of the videos can be tedious and/or error-prone.

The video(s) for copying can be selected automatically by using at least one of: a user ID (such as the log-in ID of the apparatus 200/computer system 120); the second device 202; an identifier which is read from the second device 202; or an associated ID which is associated with the video (the associated ID can be associated with the video). For example, a video(s) for copying can be selected based on a match between the associated ID of the video(s) and an identifier of the second device 202. The associated ID of the video(s) may be used to confirm that the user that made the (selected) video(s) matches the operator/owner of the secondary device 202. The associated ID(s) of the video(s) may be included in metadata of the video(s). Each video may have an associated ID to indicate the user responsible for the video, e.g. the surgeon who recorded the video.

Alternatively/additionally, the selection of videos, e.g. the selection 342a shown in FIG. 3 can be based at least partially on time. For example, the selected/copied/transferred videos can be those recorded to the first device 201 that day; e.g. those that were previously not transferred. The video(s) may be selected/copied/transferred based on combinations of attributes, e.g. the user who made the video(s), the time the video(s) was made, and an ID of the secondary device 202 which may match the information regarding the user who made the video(s).

The workflow 300 of FIG. 3 includes log-ins from users, 301L, 302L, 303L, and corresponding logouts, 301M, 302M, 303M, respectively. Bar 301L of FIG. 3 represents the log-in of a first user. After log-in 301L, the first user (a surgeon, for example) acquires at least one video 301P, 302P, 303P, (e.g. first through third videos) which can correspond respectively to videos of surgical procedures patients (first through third patients, for example). Next, as seen in FIG. 3, a second user logs in 302L after the first user logs off 301M. While the second user is logged in a fourth video 304P is taken, which is followed by the second user logging off 302M. In the example, the first user subsequently logs back on 301L2 to take a video 305P of a (fifth) procedure, subsequently logging off 301M2. The third user logs on 303L and takes the sixth and seventh videos 306P, 307P in this example.

After the third user logs off 303M, the first user logs on 301L3 and takes the eighth and ninth videos 308P, 309P.

The taken videos may be stored in a primary device 201.

FIG. 3 illustrates, after the ninth video 309P is taken, the copying of at least one video (of 301P . . . 309P) to a second device 202. FIG. 3 shows a first example workflow 331 and a second example workflow 332 for copying video(s). In the first example, the secondary device 202 is detected 301S, for example, when the device 202 becomes communicatively coupled to the computers system 120 (e.g. when the device 202 is plugged in to a USB port). In the first example workflow 331, the user selects video(s) for transfer 301S1, and starts the transfer 301S2. The videos are copied/transferred 301S3, and there is a determination 301S4 that the copying/transferring is complete.

The secondary device 202 can then be removed/unmounted/decoupling 301S5 (e.g. communicatively uncoupled), and a determination that the removal/demounting/decoupling is successful/complete 301S6. On the apparatus 201, the copied video(s) can be selected 301S7 for deletion, then deleted 301S8. Video(s) are subsequently determined deleted 301S9.

The steps of the first example workflow 331 utilize significant user interaction, and are prone to errors, such as misidentifying videos for copying/deletion. The second example workflow 332 is intended to synergistically reduce the chance for error and decrease the need of user interaction. After the secondary device is detected 301S, the workflow can go to the second example workflow 332 instead of the first. The second example workflow 332 can include a single user action 341, such as a single click. There can be an indicator provided to the user after detection 301S of the secondary device 202. The indicator can allow the user to make a single user action 341. The single user action 341 can be a button press, mouse click, or a touch screen input action, for example. The single user action 341 can activate the transfer 342 of the video(s) by the second workflow 332, e.g. a quick transfer process.

The second workflow 332 can include selecting 342a the video(s) for transfer, and copying 342b them to the secondary device 202. The second workflow 332 can also include decoupling/unmounting 301S10 (e.g. eject and/or prepare to eject) the external device 202 such as after the copying is determined finished 342c.

The quick transfer process 342 can also include marking 342d the video(s) on the first device 201 for deletion, e.g. after the video(s) are determined to be copied to the secondary device 202. It is possible that the video(s) marked for deletion are deleted upon a subsequent communicative coupling of the secondary device 202 to the apparatus. For example, when the secondary device 202 is subsequently communicatively coupled, information, such as redundant information, e.g. redundant to the determination 342c, is provided to confirm that the copy was complete. Alternatively/additionally, the video(s) marked for deletion can be done after an adjustable period of time.

When comparing the first workflow 331 and the second workflow 332, the user actions are decreased in the second workflow, which can reduce the risk of errors.

The second workflow 332 can include selecting 342a the video(s) for transfer automatically, which can be done when the second device 202 is identified, e.g. when the second device 202 is communicatively coupled to the apparatus 200. Selecting 342a the video(s) for transfer can be based on at least one of: a user ID; the second device; an identifier which is read from the second device; or an associated ID which is associated with the video. For example, the apparatus 200 compares the associated ID with at least one of: the user ID, the second device, or the identifier; and, based on the comparison, the apparatus 200 selects the video for copying.

The associate ID of the video may be an operator ID and/or surgeon ID, e.g. a user who is responsible for taking the video when it is initially recorded and/or for subsequent management of the video record.

The apparatus 200 can begin selecting the video(s) when the second device 202 is identified, such as when it becomes communicatively coupled to the apparatus 200. For example, the second device 202 is a storage device with a USB port that communicatively couples when plugged in. It is possible that the copying to the second device 202 begins automatically after the video(s) is selected. For example, there can be no user input other than plugging the second device 202 into a USB port of the apparatus.

The copying can be started after user input, such as after exactly one user input, e.g. the single user action 341, such as is shown in the second workflow 332 of FIG. 3. The one user input can be made after the video is selected (e.g. by identification of video(s) for transfer). The one user input can be a mouse click, a key press, an audible command, or a tap of a touch-sensitive device. A "zero-click" method is also envisioned, in which the selection and copying occurs whenever the secondary device 202 is communicatively coupled to the apparatus 200 and the apparatus 200 (e.g. the processor thereof) is determined to have low activity.

FIG. 4 illustrates an indicator. One or more indicators 420 430, such as of a display 410, can provide notice to the user that the videos that were recorded by the user since the last login are completely copied to the secondary device 202. For example, an optional first indicator 420 provides an icon for the single user action 341. In an example, the first indicator 420 is displayed with a list of the video(s) which have been selected for copying. The first indicator can include a list of the video(s) which are selected for copying.

An optionally second indicator 430 can indicate that the copying is complete to the secondary device 202, and/or that the secondary device 202 can be safely removed, e.g. such that complete videos have been copied to the secondary device 202.

One or more video(s) can be selected for transferring/copying based on, for example, the identification of the second device 202 and/or an identifier read from the second device 202. For example the identifier read from the second device 202 can be compared to associated IDs of the videos. The video(s) that are selected/copied/transferred to the second device 202 can be the videos which are associated with a user. For example, as depicted in FIG. 3, the first user, who logs in 301L, records the videos 301P, 302P, 303P. In the first user's second log-in 301L2, the fifth video 305P is recorded. In the first user's third log-in 301L3, the ninth video 309P is recorded. The first user's videos 301P, 302P, 303P, 305P, 309P are selected 342a, and copied 342b to the second device 202. As depicted in FIG. 3, after the first or second workflow 331, 332, the secondary device 202 is removed 301S10, and the first user logs off 301M3.

It is particularly envisioned that the video(s) which are selected/copied/transferred are of a plurality of video(s) stored on the first device 201. The stored videos on the first device 201 may each have associated IDs that may indicate the respective user(s) associated with the making of the video, e.g. the respective responsible surgeon(s).

It is also envisioned that the user may avoid tedious selection and copying processes by inserting the secondary device 202, optionally making the single user action 341, e.g. a single click, and having the apparatus 200 select, copy, and mark for deletion the video(s). The user subsequently receives a notice that the copying is complete, e.g. on a display. The notice of completion can prompt the user to disconnect/remove the secondary device 202.

The methods and apparatuses described herein, particularly with respect to the second workflow 332 reduce the chance of corrupted surgical videos and/or may increase user work efficiency.

Optionally, a security check can be performed to ensure that the secondary device 202 is a device which is authorized to receive copies of the video(s), e.g. the selected videos, e.g. before the copying. For example, the secondary device may include a digital ID, which may act as an identifier of the secondary device 202.

The apparatus 200 and/or methods described herein may provide better security of medical records (videos). For example, it may be possible to have the apparatus 200 uncoupled to a network, at least during surgical procedures and during copying of files. This may provide additional security against malware that may negatively impact the operation of the apparatus 200 and/or surgical instrument such as a microscope 110. Video records may be, in some configurations, copyable only by physical coupling of a USB device, e.g. for increased security.

The memory requirements of surgical videos can be significantly high, particularly since the availability of high resolution cameras. In an example an ultra-high definition UHD video may have 3840×2160 pixels and 60 frames per second (fps). For example, with 8 bits and 3 color channels (e.g. RGB), each second of video may use 11 Gb/s of data. Compression can reduce that; for example H.264 compression (base-profile medium, level 5.2) can lead to a possible maximum of 240 Mbps. USB-based external storage may not be stable enough for long hour real time recording. Compression is sometimes done after acquisition of the video. It can be desirable to have a high bandwidth primary device 201 for recording the video in real time, for example, and a second device 202 for storing the copy/copies of video(s) after acquisition.

Users often prefer to use a primary device which has suitable bandwidth and is robustly communicatively coupled with the video acquisition unit (e.g. a camera). Subsequently, the video(s) is copied/transferred to the secondary device 202, such as removable storage (e.g. a USB device).

USB ports may share 5 Gbps bandwidth (USB3.1 Gen1), for example. An example theoretical USB bandwidth is about 625 MB/s (USB 3.1Gen1) or 1250 MB/s (USB3.1Gen2). Actual performance may be different. In an example, HDD-based performance may be about 90 MB/s (peak), and SSD-based performance may be 300 MB/s (peak). If there are other USB device(s) attached, bandwidth can be be shared among two devices which may reduce speed also.

In view of the technical characteristics, there are multiple challenges for handling large video records, particularly among different devices and/or users.

It is possible to use as the primary device 201 internal storage (SATA/NVMe), e.g. for recording the video. It is possible to use up to the full bandwidth of SATA (600 MB/s) and NVMe (up to 3000 MB/s) SSD. Such a primary device may be relatively inexpensive and/or not require upgrading of legacy systems. Another advantage may be that the communication coupling between the acquisition unit (e.g the camera) and the primary device 201 can be robust, e.g. no issues with loose cables.

FIG. 500 illustrates a method 500 of copying a video of a surgical procedure. The method 500 can be that as described herein, e.g. with respect to the other FIGS. 1-4, for example. The method 500 includes transferring 501 data of a video of a surgical procedure from a first device to a second device; determining 502 when the video is completely copied to the second device; and indicating 503 that the copying is complete, automatically, after the determination.

The methods/apparatuses described herein can reduce file transfer complexity, particularly using a single user action 341 and/or one click. Videos can be copied/transferred/extracted. Videos can be transferred to the secondary device 202, e.g. external storage. After video transfer, the secondary device 202 can be ejected automatically. The video record of the primary device 202 can be marked for deletion and/or deleted automatically after an adjustable time period, e.g. 30 days.

The apparatus 200 as described herein is particularly envisioned as being coupled to a surgical instrument, particularly one that is configured to acquire videos, such as a surgical microscope 110.

Examples described herein are for illustration. The apparatus can copy one or more videos; e.g. the apparatus can select, copy, and determine that the copying is finished for more than one video, as well as one video. In other words, the apparatus described herein is not limited to selecting only one video, i.e. more videos can be selected and copied/transferred, e.g. by a single user input. The invention is defined by the appended claims and their equivalents.

LIST OF REFERENCE SIGNS

| | |
|---|---|
| 100 | system |
| 101 | processor |
| 107 | memory |
| 110 | microscope |
| 120 | computer system |
| 200 | apparatus |
| 201 | first device |
| 202 | second device |
| 211 | video |
| 212 | video |
| 213 | video |
| 331 | first example workflow |
| 332 | second example workflow |
| 341 | single user action |
| 342 | quick transfer |
| 301L | first user login |
| 301M | first user logoff |
| 301M3 | first user logoff |
| 301P | video |
| 301S | the secondary device detection |
| 301S1 | selection of videos |
| 301S10 | decoupling |
| 301S2 | transfer |
| 301S3 | copy/transfer |
| 301S4 | determination of completion |
| 301S5 | removal |
| 301S6 | decoupling complete |
| 301S7 | selection for deletion |
| 301S8 | deletion |
| 301S9 | determination of deletion |
| 302L | second user login |
| 302M | second user logoff |
| 302P | video |
| 303L | third user login |
| 303M | third user logoff |
| 303P | video |
| 304P | video |
| 305P | video |
| 306P | video |
| 307P | video |
| 308P | video |
| 309P | video |
| 342a | select video |
| 342b | copy video |
| 342c | determination that copy is complete |
| 342d | mark for deletion |
| 410 | display |
| 420 | first indicator |
| 430 | second indicator |
| 500 | method |
| 501 | transferring |
| 502 | determining |
| 503 | indicating |

The invention claimed is:

1. An apparatus comprising:
a processor; and
a memory,
wherein the processor is configured to:
record at least one video of a surgical procedure to an internal storage implemented by the memory;
copy the video of the surgical procedure from the internal storage to an external storage;
determine that the video is copied to the external storage; and
cause a displayed indication that the copying is complete, automatically, after the determination, wherein the processor is further configured to automatically select the video for copying based on a user identifier (ID) indicating a user associated with making of the video and an ID of the external storage, wherein the processor is configured to select the video for copying based on comparison of the user ID and the ID of the external storage.

2. The apparatus of claim 1, wherein the internal storage has higher bandwidth than the external storage.

3. The apparatus of claim 1, the processor is further configured to automatically begin selecting the video when the external storage is identified.

4. The apparatus of claim 1, wherein the processor is further configured to:
start copying after exactly one user input after the video is selected, the one user input being a mouse click, a key press, an audible command, or a tap of a touch-sensitive device.

5. The apparatus of claim 1, wherein the processor is further configured to:
start copying automatically after the video is selected.

6. The apparatus of claim 1, wherein the processor is further configured to:
select the video from a plurality of videos stored on the internal storage.

7. The apparatus of claim 1, wherein the processor is further configured to:
mark the video in the internal storage for deletion after the video is copied to the external storage.

8. The apparatus of claim 1, wherein the processor is further configured to:
automatically disconnect the external storage after the determination.

9. The apparatus of claim 1, wherein the apparatus is coupled to a surgical instrument configured to take images of the video.

10. A method of copying a video of a surgical procedure, comprising:
recording at least one video of a surgical procedure to an internal storage;
transferring data of the video of the surgical procedure from the internal storage to an external storage;
determining when the video is completely copied to the external storage; and
indicating that the copying is complete, automatically, after the determination,
wherein the video is automatically selected for the transferring based on a user identifier (ID) indicating a user associated with making of the video, and an ID of the external storage such that the video is selected for transferring based on comparison of the user ID and the ID of the external device.

11. A non-transitory computer-readable medium including a program code for performing the method of claim 10 when the computer program is run on a processor.

* * * * *